(12) United States Patent
Shim et al.

(10) Patent No.: US 10,831,300 B2
(45) Date of Patent: Nov. 10, 2020

(54) MOBILE TERMINAL

(71) Applicant: LG ELECTRONICS INC., Seoul (KR)

(72) Inventors: Hongjo Shim, Seoul (KR); Hyunwoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/186,417

(22) Filed: Nov. 9, 2018

(65) Prior Publication Data
US 2019/0250752 A1 Aug. 15, 2019

(30) Foreign Application Priority Data
Feb. 13, 2018 (KR) .................. 10-2018-0017421

(51) Int. Cl.
| | |
|---|---|
| *G06F 3/041* | (2006.01) |
| *G06F 3/044* | (2006.01) |
| *G06K 9/00* | (2006.01) |
| *G06F 3/01* | (2006.01) |
| *G09G 3/3208* | (2016.01) |

(52) U.S. Cl.
CPC ............ *G06F 3/0414* (2013.01); *G06F 3/016* (2013.01); *G06F 3/044* (2013.01); *G06K 9/0002* (2013.01); *G06K 9/00087* (2013.01); *G09G 3/3208* (2013.01)

(58) Field of Classification Search
CPC ...... G06F 3/016; G06F 3/04883; G06F 3/044; G06F 3/0414; G06F 2203/04103; G06K 9/0002; G06K 9/00087; G09G 3/3208
See application file for complete search history.

(56) References Cited

U.S. PATENT DOCUMENTS

| | | | | |
|---|---|---|---|---|
| 2007/0097073 | A1* | 5/2007 | Takashima | ............... G06F 3/016 345/156 |
| 2011/0115734 | A1* | 5/2011 | Harashima | ............... G06F 3/016 345/173 |
| 2012/0126940 | A1* | 5/2012 | Coggill | ................... G06F 21/32 340/5.54 |
| 2013/0250502 | A1* | 9/2013 | Tossavainen | ........... G06F 3/016 361/679.01 |
| 2019/0267995 | A1* | 8/2019 | Du | ...................... H01L 41/1132 |

FOREIGN PATENT DOCUMENTS

CN 106449966 A * 2/2017 .......... H03K 17/964

* cited by examiner

*Primary Examiner* — Stacy Khoo
(74) *Attorney, Agent, or Firm* — Lee, Hong, Degerman, Kang & Waimey

(57) ABSTRACT

There is disclosed a mobile terminal comprising: a display module; a first piezoelectric layer provided on a rear surface of the display module and configured to vibrate the display module by forming a first frequency in an audible range; and a second piezoelectric layer provided on the rear surface of the display module and configured to sense the pressure transmitted from the display module and provide a haptic feedback at a second frequency, wherein the second piezoelectric layer is thicker than the first piezoelectric layer in a front-to-back direction and fixedly coupled to the first piezoelectric layer.

18 Claims, 21 Drawing Sheets

MOBILE TERMINAL

CROSS-REFERENCE TO RELATED APPLICATIONS

Pursuant to 35 U.S.C. § 119(a), this application claims the benefit of earlier filing date and right of priority to Korean Patent Application No. 10-2018-0017421, filed on Feb. 13, 2018, the contents of which are all hereby incorporated by reference herein in their entirety.

BACKGROUND OF THE DISCLOSURE

Field of the Disclosure

Embodiments of the present disclosure relate to a mobile terminal which may provide a combining structure configured of a receiver, a haptic sensor and a force sensor, using a piezo material.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

To support and enhance such the functions of the mobile terminal, improvement of a structure and/or software programs of the mobile terminal may be put into consideration.

There are ongoing studies and researches for reducing bezel from a front surface of the mobile terminal and expanding a display module. That is to allow the user to see a wider image on the display module, even without enlarging the size of the mobile terminal. However, the mobile terminal typically includes an audio output module that is provided in the bezel and it is limited to reduce the bezel, using conventional methods.

Moreover, according to a recent trend, a home button is provided as a touch key that is arranged in a specific location on the display module, instead of a mechanical key, so as to expand the display module. Such a touch key on the display may expand the display module advantageously but is limited to realize the manipulation sense of the mechanical key disadvantageously.

SUMMARY OF THE DISCLOSURE

Accordingly, an object of the present invention is to address the above-noted and other problems and provide a mobile terminal which includes a piezoelectric layer provided on a rear surface of a display module and configured to function as a receiver so as to remove a bezel area for providing an audio output module by generating a sound through the vibration of the display module.

Another object of the present invention is to provide a mobile terminal of which a piezoelectric layer provided on a rear surface of a display module may function as a haptic module and a force sensor so as to provide a user with a similar manipulation sense of a mechanical button.

A further object of the present invention is to provide a mobile terminal which may not drop a low range sound pressure, even when the piezoelectric layer generates sounds.

A still further object of the present invention is to provide convenient finger-print verification by connecting the piezoelectric layer configured to function as the haptic module and the force sensor with a finger scan sensor.

A still further object of the present invention is to provide the user with diverse vibration patterns via the piezoelectric layer configured to function as the haptic module and the force sensor.

Embodiments of the present disclosure may provide a mobile terminal comprising: a display module; a first piezoelectric layer provided on a rear surface of the display module and configured to vibrate the display module by forming a first frequency in an audible range; and a second piezoelectric layer provided on the rear surface of the display module and configured to sense the pressure transmitted from the display module and provide a haptic feedback at a second frequency, wherein the second piezoelectric layer is thicker than the first piezoelectric layer in a front-to-back direction and fixedly coupled to the first piezoelectric layer.

The first piezoelectric layer may be provided corresponding to a first area of the rear surface of the display module, and the second piezoelectric layer may be provided in a second area included in the first area and insulated with the first piezoelectric layer.

The second area may be located in an edge area of the first area and a center of the overall mass of the first and second piezoelectric layers is deviated from a center of the first area.

The mobile terminal may further comprise a support frame configured to support the display module, wherein the first piezoelectric layer and the second piezoelectric layer are disposed between the display module and the support frame.

The display module may comprise an OLED pixel module configured to emit light; and a non-light-transmittance layer disposed under the OLED pixel module, and the non-light-transmittance layer may comprise a first hole configured to partially insert a front area of the second piezoelectric layer therein.

The support frame may comprise a stepped area configured to engage with the first piezoelectric layer; and a second hole configured to partially insert a rear area of the second piezoelectric layer therein.

The second piezoelectric layer may comprise a third hole that is open in the front-to-back direction; and a sensor provided in the third hole and configured to sense the signal transmitted and received via the display module.

The sensor may be a finger scan sensor configured to recognize a user's fingerprint.

The finger scan sensor may recognize the user's fingerprint, when a preset pressure is applied to the second piezoelectric layer.

The second piezoelectric layer may have a polygonal loop shape and senses the size of the pressure applied to each of corners.

The display module may display an indicator configured to compensate the direction in which the pressure is applied, when a difference between the sizes of the pressures applied to the corners of the second piezoelectric layer is over a preset error range.

The second piezoelectric layer may generate a second frequency, when the finger scan sensor recognizes the user's fingerprint.

The mobile terminal may further comprise a third piezoelectric layer provided behind the finger scan sensor and configured to sense the pressure transmitted from the finger scan sensor and form a third frequency.

The third piezoelectric layer may form the third frequency, when the finger scan sensor recognizes the fingerprint.

The third frequency may be equal to the second frequency.

A plurality of second piezoelectric layers may form a specific vibration pattern via the display module, and the specific vibration pattern may be formed by varying a vibration strength, presence of vibration, a vibration location, a vibration phase difference and a vibration frequency.

The display module may be a touch screen, and the second piezoelectric layer may form the specific vibration pattern according to the location of the touch input applied to the display module.

According to the embodiments of the present disclosure, there are following advantages.

The mobile terminal is capable of realizing a first piezoelectric layer functioning as a receiver on a under display so as to omit the bezel provided to realize an audio output module and expand the overall area of a display module.

Furthermore, the second piezoelectric layer configured to function as the haptic module and the force sensor is thicker than the first piezoelectric layer and realized on the under display. Accordingly, the mechanical key may be replaced and the user may be provided with a strong haptic feedback.

Still further, the thickness of the mobile terminal may be minimized, even when the thickness of the first piezoelectric layer is different from that of the second piezoelectric layer.

Still further, the mobile terminal including the first and second piezoelectric layers fixedly coupled to each other is capable of solving the problem of the reduced low sound range pressure that is caused when the sound is generated by using the piezo material.

Still further, the finger scan sensor is provided in the second piezoelectric layer. Accordingly, the pressure applied by the user may be sensed and the user's fingerprint is recognized simultaneously, while the haptic feedback is provided to the user.

Still further, the second piezoelectric layer is able to recognize the directivity. After the user touches the finger on a point misoriented from a regular point of the finger scan sensor, the display module may display an indicator configured to indicate the user to move the finger to the proper regular point.

Still further, the plurality of the second piezoelectric layers may be provided such that the user may be provided with the diverse vibration patterns.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
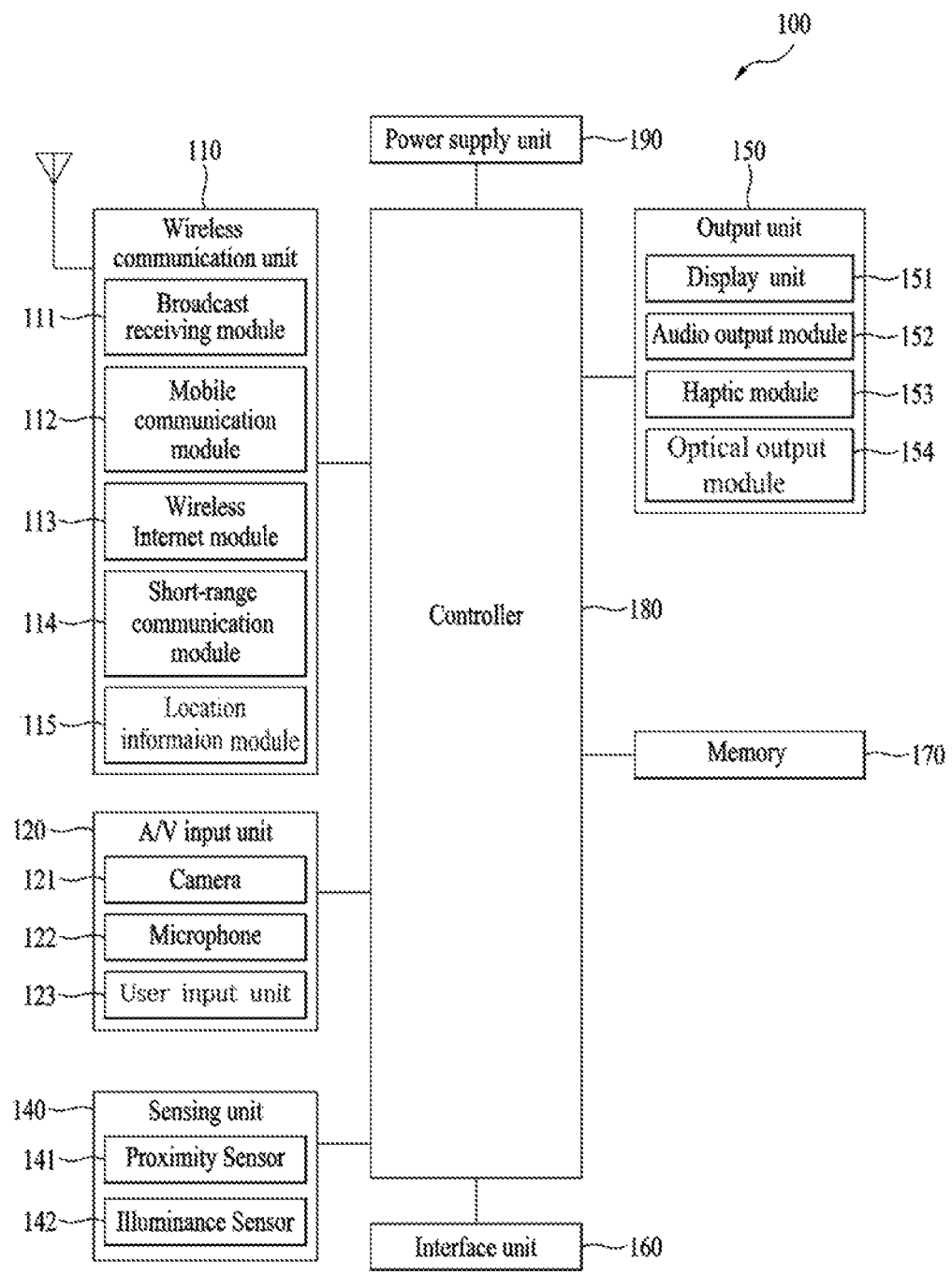
FIG. 1A is a block diagram of a mobile terminal in accordance with the present disclosure.
Figure 1B:
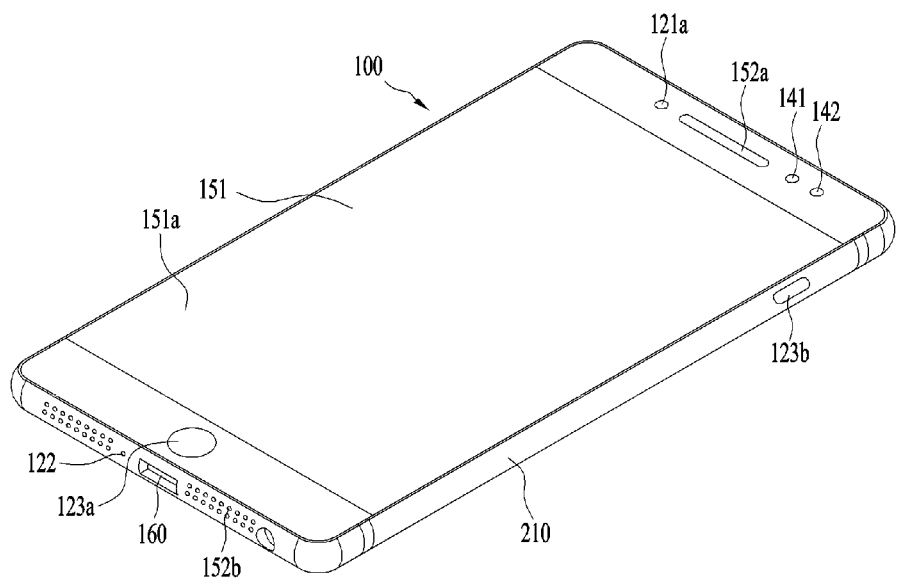
FIGS. 1B and 1C are conceptual diagrams of the mobile terminal, viewed from different directions.
Figure 1C:
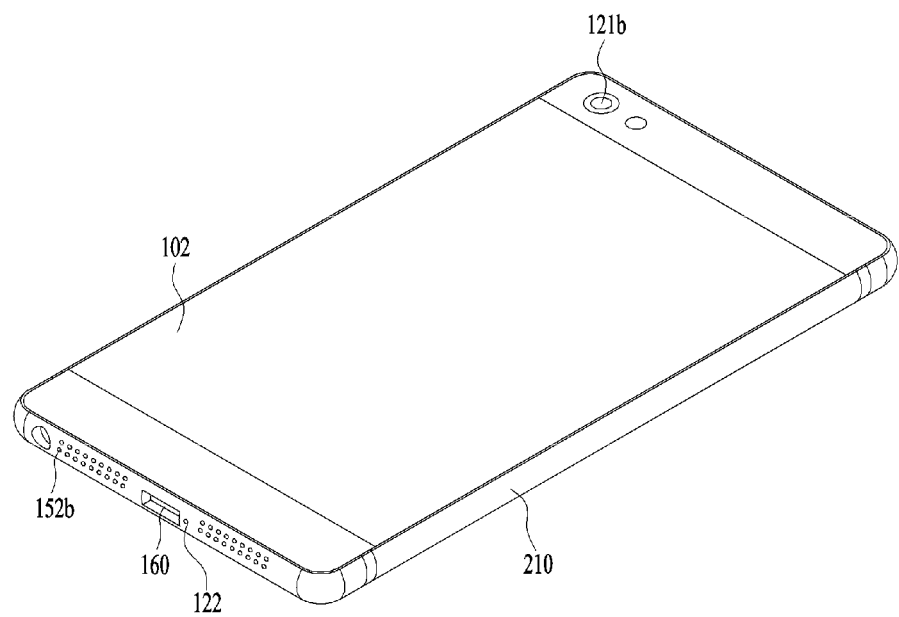

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 is shown having If desired, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor.

Examples of typical touch objects include a finger, a touch pen, a stylus pen, a pointer, or the like.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

The haptic module 153 is configured to receive the signal output from the touch sensor or the finger scan sensor and provide the user with a haptic feedback.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. Various electronic components are incorporated into a space formed between front case and the rear case. In recent years, as the size of a window 151a of the display unit 151 increases, the window 151a of the display unit 151 can be configured to cover the entire front surface.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The mobile terminal 100 is provided with a display module 151, first and second sound output units (152a, 152b), a proximity sensor 141, an illuminance sensor 142, first and second cameras (121a, 121b), first and second operation units (123a, 123b), a microphone 122, an interface unit 160.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121a. If desired, The second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash is shown adjacent to the second camera 121b. When an image of a subject is captured with the second camera 121b, the flash may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

The mobile terminal 100 is provided with a proximity sensor 141, an illuminance sensor 142, a first sound output module 152a, and a first camera 121a in front case. This can limit an area which is for display unit 151. This limit is growing need for full display unit 151.

Figure 2:
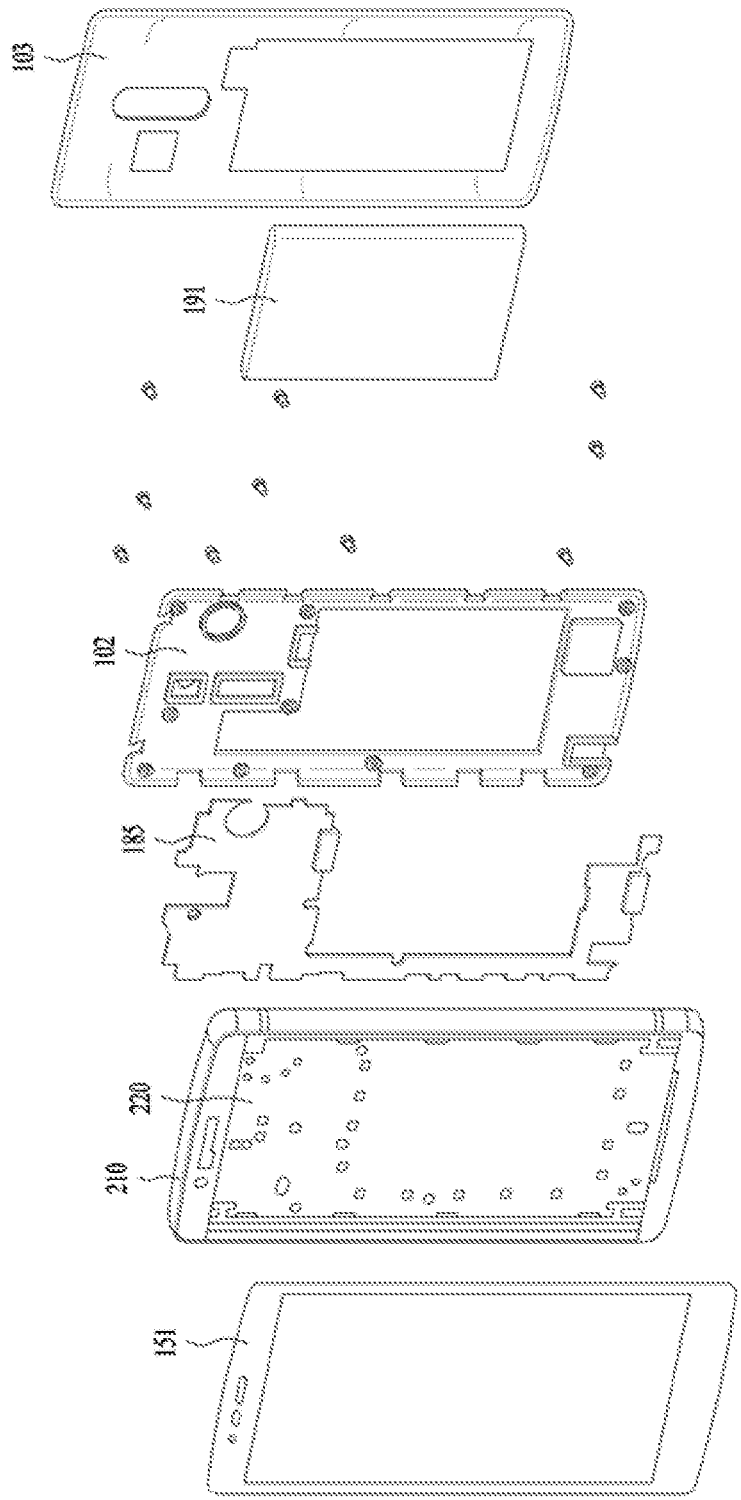
FIG. 2 is an exploded perspective diagram of the mobile terminal.

FIG. 2 is an exploded perspective diagram of the mobile terminal and the terminal 100 can include a metal plate 220 for supporting the back surface of the display unit 151. Various components such as a printed circuit board 185 and the battery 191 can mounted on the rear surface of the metal plate 220. The middle case 210 can cover the side surface of the metal plate 220. Rear case 102 and rear cover 103 can be combined to the middle case 210 and cover the components mounted on the rear surface of the metal plate 220.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Hereinafter, embodiments that can be implemented in a mobile terminal configured as above will be described with reference to the accompanying drawings. It will be apparent to those skilled in the art that the present invention may be embodied in other specific forms without departing from the spirit or essential characteristics thereof.

Recently, the technical trend of the mobile terminal is to enlarge the display module while maintaining the size of the existing mobile terminal, thereby providing the user with a wider screen image.

At this time, the mobile terminal may be limited in expanding the display module due to the components provided on the front side.

Referring to FIG. 1B, the first sound output unit 152a may be a limiting factor for expanding the display unit 151.

The general mobile terminal 100 includes a receiver on the rear side of the first sound output unit 152a and transmits the sound output from the receiver to the user through the first sound output unit 152a.

The mobile terminal 100 generally places the first sound output unit 152a on the front side of the mobile terminal 100 in order to directly output sound to the user's ear so as to minimize sound leakage to the outside.

Accordingly, the mobile terminal 100 includes a bezel unit having the first sound output unit 152a on its front side, and the conventional mobile terminal 100 has a limitation in expanding the display module corresponding to the area occupied by the bezel unit.

Further, the receiver positioned at the rear of the first sound output unit 152a may limit the space in which the other components of the mobile terminal are mounted. For example, in recent years, a 3D depth camera capable of extracting a user's 3D motion is intended to be provided on the front side of a mobile terminal, and a receiver located on the rear side of the first sound output port 152a has a 3D depth Depth) Camera installation may be limited.

Also, in one embodiment of expanding the display module, the mechanical key provided on the front of the mobile terminal is removed, and the touch input of the display module replaces the mechanical key. Referring to FIG. 1B, the display module may be restricted by the bezel portion including the first user input unit 123a and the first user input unit 123a. Therefore, the display module can be extended by replacing the first user input unit 123a with the touch input.

However, the reason why the first user input unit 123a is formed by the mechanical key with the home button is that it gives the user a sense of operation. Therefore, a technique for giving a user a sense of operation despite the touch key is becoming important.

Hereinafter, an integrated structure of a receiver, a haptic module, and a force sensor (one kind of the touch sensor) utilizing a piezo material on the rear surface of the display module will be described.

Figure 3:
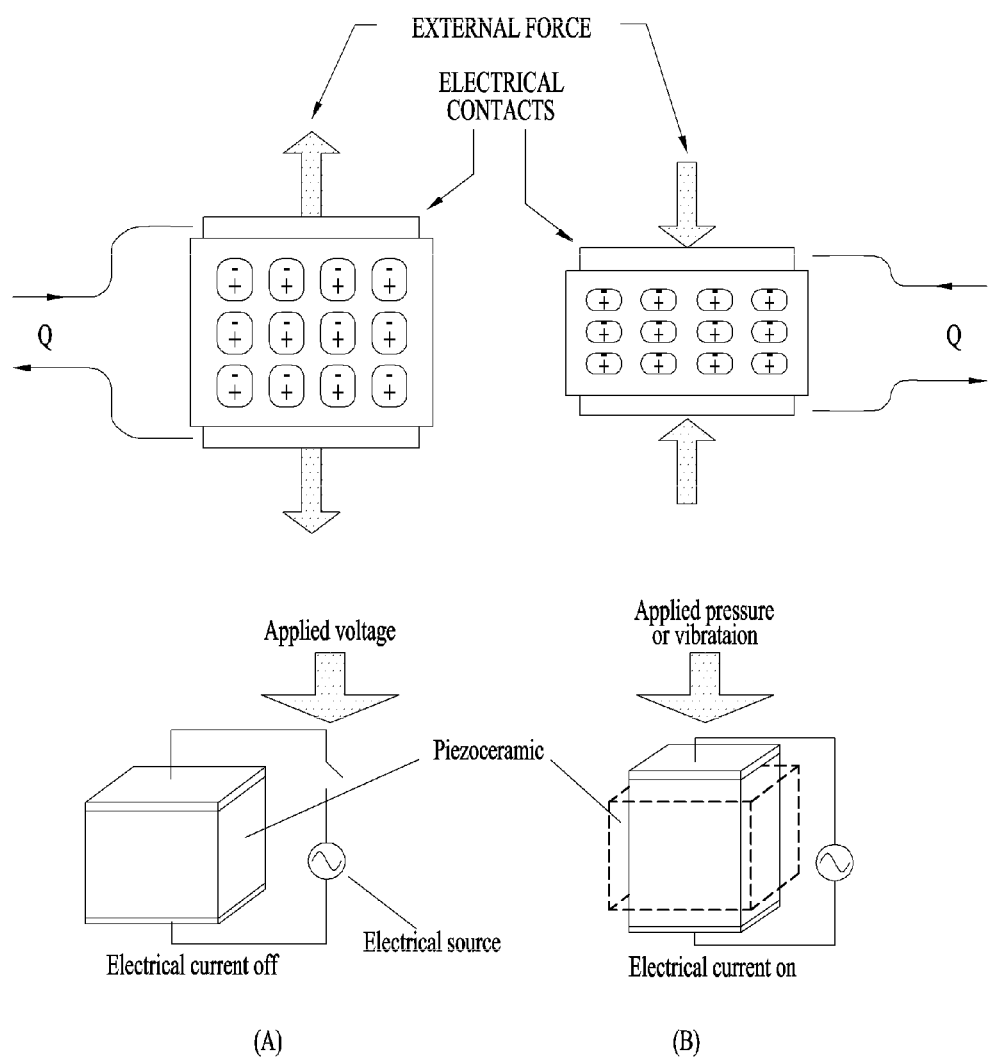
FIG. 3 is a diagram to describe general characteristics of a piezo material that is provided to form an integral structure configured of a receiver, a haptic module and a force sensor.

FIG. 3 is a diagram to describe general characteristics of a piezo material that is provided to form an integral structure configured of a receiver, a haptic module and a force sensor.

The piezo material means a material which generates a voltage, when a mechanical force is applied thereto, of which mechanical deformation occurs when it is voltage free.

When the deformation is caused by the mechanical force applied to the piezo material, dielectric polarization occurs and electricity is then generated, which is called a direct effect or a first piezoelectric effect and shown in FIG. 3 (b). In contrast, the deformation is caused by the electricity applied to the piezo material, which is called an inverse piezoelectric effect or a second piezoelectric effect and shown in FIG. 3 (a).

The piezoelectric effect is related to a principle that an electric dipole moment is generated in a solid. Most materials that form in crystals have positive particles and negative particles. The positive particles and the negative particles are arranged regularly to form electric neutrality. However, the positions of the particles forming in crystals are changed by an external force applied thereto and an electric energy is then generated.

If a larger voltage is applied to the piezo material, the mechanical deformation (or the displacement) of the piezo material may be enlarged but it could be limited to enlarge the displacement. For example, there might be a heat generation problem and a high power consumption problem such that such the piezo material having the above-noted problems may not be proper to a device (e.g., a mobile terminal) which uses a battery.

Accordingly, it is necessary to look at the factors that can enlarge the displacement of the piezo material, except the voltage.

Figure 4:
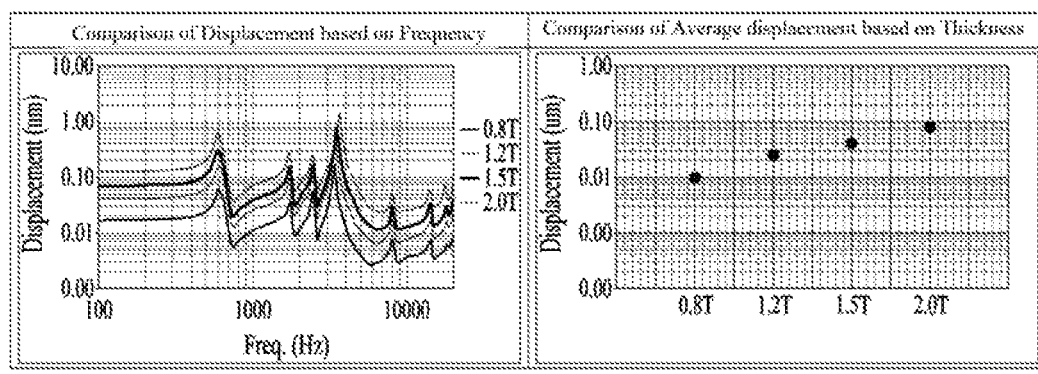
FIG. 4 is a graph to describe a characteristic that the displacement of the piezo material is varied according to the frequency and thickness.

FIG. 4 is a graph to describe a characteristic that the displacement of the piezo material is varied according to the frequency and thickness.

The factors which can vary the mechanical deformation of the piezo material rather than the voltage may include a frequency. It is limited to enlarge the mechanical deformation (or the displacement) of the piezo material and a specific frequency is can enlarge the displacement of the piezo material limitedly, such that it can be limited to generate diverse vibration patterns, using the piezo material.

Accordingly, it can be considered as one of the factors for enlarging the mechanical deformation of the piezo material to enlarge the thickness of the piezo material. The mechanical deformation (the displacement) of the piezo material is enlarged more as the thickness between both poles is increased more.

Even unless a large voltage is applied to the piezo material having the increased thickness, the mechanical deformation (the displacement) of the piezo material may be increased even at diverse frequencies.

Hereinafter, an integral structure configured of a receiver, a haptic module and a force sensor by using the piezo material will be described.

Figure 5:
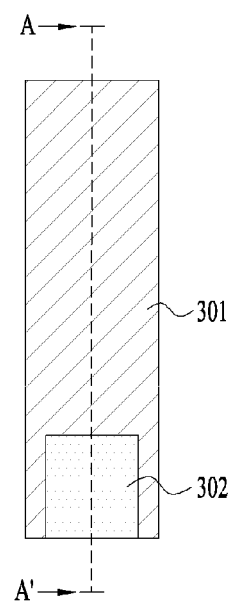
FIG. 5 is a front view illustrating an integral structure configured of a receiver, a haptic module and a force sensor in according to one embodiment.

FIG. 5 is a front view illustrating an integral structure configured of a receiver, a haptic module and a force sensor in according to one embodiment.

Figure 6:
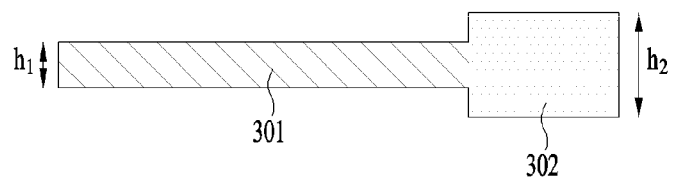
FIG. 6 is a sectional diagram illustrating the integral structure configured of the receiver, the haptic module and the force sensor, viewed along A-A' of FIG. 5.

FIG. 6 is a sectional diagram illustrating the integral structure configured of the receiver, the haptic module and the force sensor, viewed along A-A' of FIG. 5.

The mobile terminal in accordance with the present disclosure may include a display module; a first piezoelectric layer 301 provided on a rear surface of the display module and configured to vibrate the display module by forming a first frequency at an audible area; and a second piezoelectric layer 302 provided in the rear surface of the display module and configured to sense the pressure transmitted from the display module and provide a haptic feedback of a second frequency.

The first piezoelectric layer 301 and the second piezoelectric layer 301 may be formed of the piezo material.

The second piezoelectric layer 302 may have a larger thickness (h1<h2) than the first piezoelectric layer 301 in a front-to-back direction.

The second piezoelectric layer 302 may be spaced a preset distance apart from the first piezoelectric layer 301. However, it is preferred that the second piezoelectric layer 302 is fixedly coupled to the first piezoelectric layer 301 in contact, which will be described, referring to FIG. 8.

The first piezoelectric layer 301 is provided under the display module and configured to form a first frequency in an audible sound range by using the display module as a diaphragm. In other words, the first piezoelectric layer 301 may function as a receiver.

The mobile terminal may output sounds via the display module used as the diaphragm such that it may have no first audio output unit 152a shown in FIG. 1B. Accordingly, the bezel provided to form the first audio output unit 152a may be omitted and the display module can be expanded.

Moreover, the mobile terminal needs no auxiliary space formed in a lower area of the first audio output unit 152a to insert the receiver therein such that a 3D depth camera may be provided in such the auxiliary space for the receiver.

The second piezoelectric layer 302 may provide a haptic feedback while functioning as a force sensor configured to sense the pressure via the display module.

With the larger thickness (h2>h1) than the first audio output unit 152a, the second piezoelectric layer 302 may provide a stronger haptic feedback, which is related with the characteristic of the piezo material described, referring to FIG. 4.

The mobile terminal may not use a mechanical key to realize a home button but use a touch key realized on a touch screen. Accordingly, no auxiliary bezel for providing the mechanical key on the front surface of the mobile terminal needs to be provided such that the display module can be expanded.

Even when providing the home button by using the touch key, the mobile terminal may provide the user with a similar manipulation sense to the manipulation sense of the mechanical key. To provide the user with the similar manipulation sense to the mechanical key, the haptic module has to provide a corresponding haptic feedback to the strong feedback felt by the user when pressing the home button. The second piezoelectric layer 302 is thicker than the first piezoelectric layer 301 such that it may provide the user with a correspondingly strong feedback.

Also, to provide the user with the similar manipulation sense to the manipulation sense of the mechanical key, the point at which the haptic feedback is provided has to equal to the point at which the home button is pressed. The second piezoelectric layer 302 configured to perform the force sensor function and the haptic module function may be equal to each other.

Figure 7:
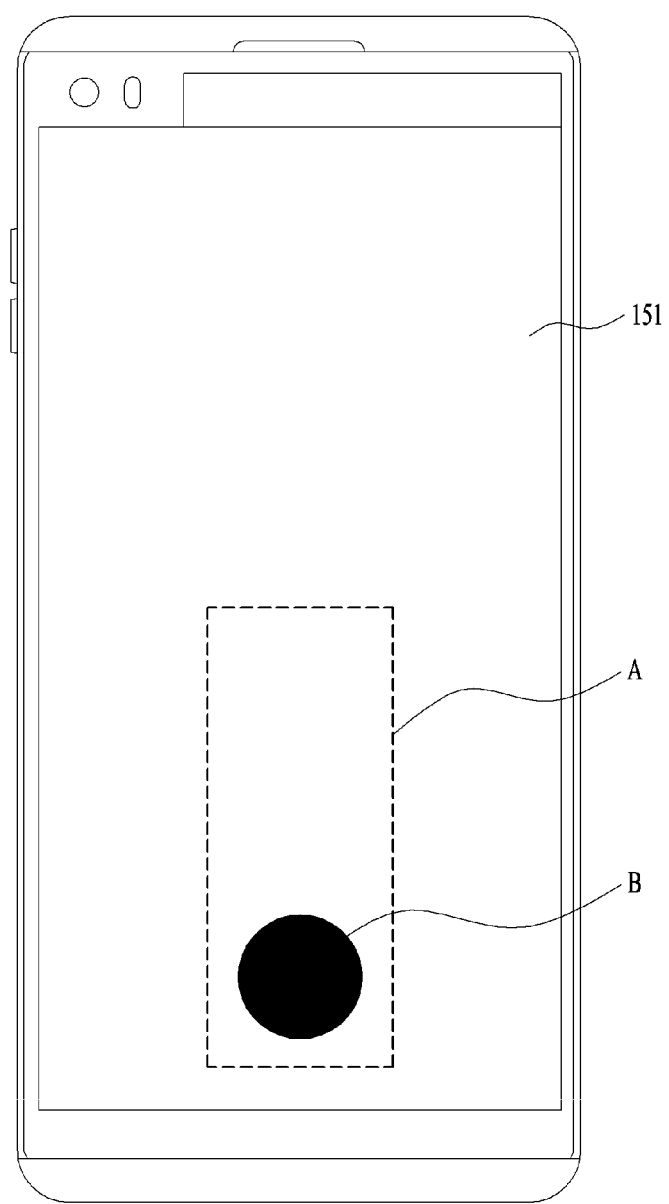
FIG. 7 is a front view of the mobile terminal to describe the arrangement of the integral structure configured of the receiver, the haptic module and the force sensor.

FIG. 7 is a front view of the mobile terminal to describe the arrangement of the integral structure configured of the receiver, the haptic module and the force sensor.

The integral structure of the receiver, the haptic module and the force sensor which is facilitated by the first and second piezoelectric layers may be arranged corresponding to 'A' of the rear surface of the display unit 151. The second piezoelectric layer may be arranged corresponding to 'B' (a touch input area) on the display unit 151. The touch input area (B) may be corresponding to the home button (the first manipulation unit 123a, see FIG. 1B) of the conventional mobile terminal.

In other words, when the user applies a predetermined pressure to the touch input area (B) configured to function as the home button, the second piezoelectric layer may sense the pressure and provide the haptic feedback.

Hereinafter, the effect that the second piezoelectric layer is fixedly coupled to the first piezoelectric layer will be described.

Figure 8:
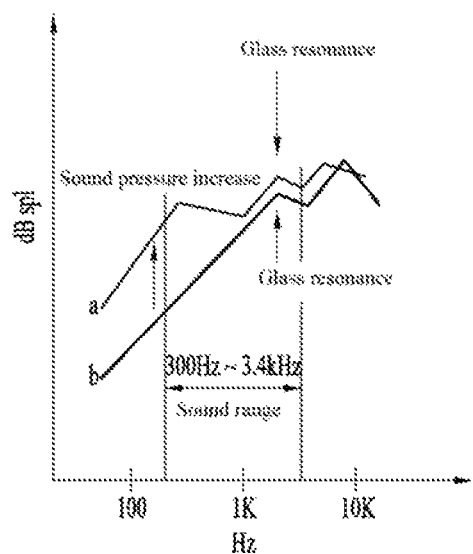
FIG. 8 is a graph to describe a characteristic that the low range sound pressure is raised by using the integral structure configured of the receiver, the haptic module and the force sensor.

FIG. 8 is a graph to describe a characteristic that the low range sound pressure is raised by using the integral structure configured of the receiver, the haptic module and the force sensor.

When a frequency in an audible band is formed by using the piezo material, the pressure of low range sounds could be lowered disadvantageously.

That disadvantage may be solved by lowering the frequency which facilitates the resonance of the display module or the first piezoelectric layer. One method for lowering the resonance frequency is increasing the weight of the first piezoelectric layer.

The resonance frequency is characterized to become low when the weight (W) is increased, as shown in a following formula (K means stiffness):

$$f_{(hz)} = \frac{1}{2\pi}\sqrt{\left(\frac{K_{(lb/in)}}{W_{(lb)}}\right) \times 386_{(in/sec^2)}}$$

The resonance frequency becomes low with respect to the same weight, in case the center of gravity is sloped. The difference in the action of force according to the shape or pattern of an object, even with the same material property (or coefficient of elasticity), may be one of the major factors in determining the stiffness. As the center of gravity is sloped more, the stiffness (K) becomes greater.

Accordingly, the second piezoelectric layer is fixedly coupled to one end of the first piezoelectric layer so as to lower the resonance frequency of the first piezoelectric layer.

More specifically, the first piezoelectric layer is provided corresponding to a first area of the rear surface of the display and the second piezoelectric layer is provided in a second area included in the first area. As the second piezoelectric layer functions independently from the first piezoelectric layer, it is preferred that the first and second piezoelectric layers are insulated with each other.

The second area is located in an edge of the first area such that the center of the overall mass including the first and second piezoelectric layers might deviate from the center of the first area. Accordingly, the center of the piezoelectric layer forming the first frequency is sloped so as to realize the effect of lowering the resonance frequency of the first piezoelectric layer.

The second piezoelectric layer is employed to increase the sound pressure in the low sound range of the audible frequency at which the first piezoelectric layer is generated, while providing the force sensor and the haptic feedback via the display module.

'a' shown in FIG. 8 indicates the sound pressures according to the resonance frequency in a state where the second piezoelectric layer and 'b' shown in FIG. 8 indicates the sound pressure according to the resonance frequency in a state no second piezoelectric layer is provided. The low range sound pressure of 'a' is increased more than that of 'b' shown in FIG. 8. (It can be said that the resonating frequency is lowered in 'a' of FIG. 8 than 'b' of FIG. 8.

Next, a structure configured to prevent the overall thickness of the mobile terminal from being increased by the first and second piezoelectric layers which have different thicknesses will be described.

Figure 9:
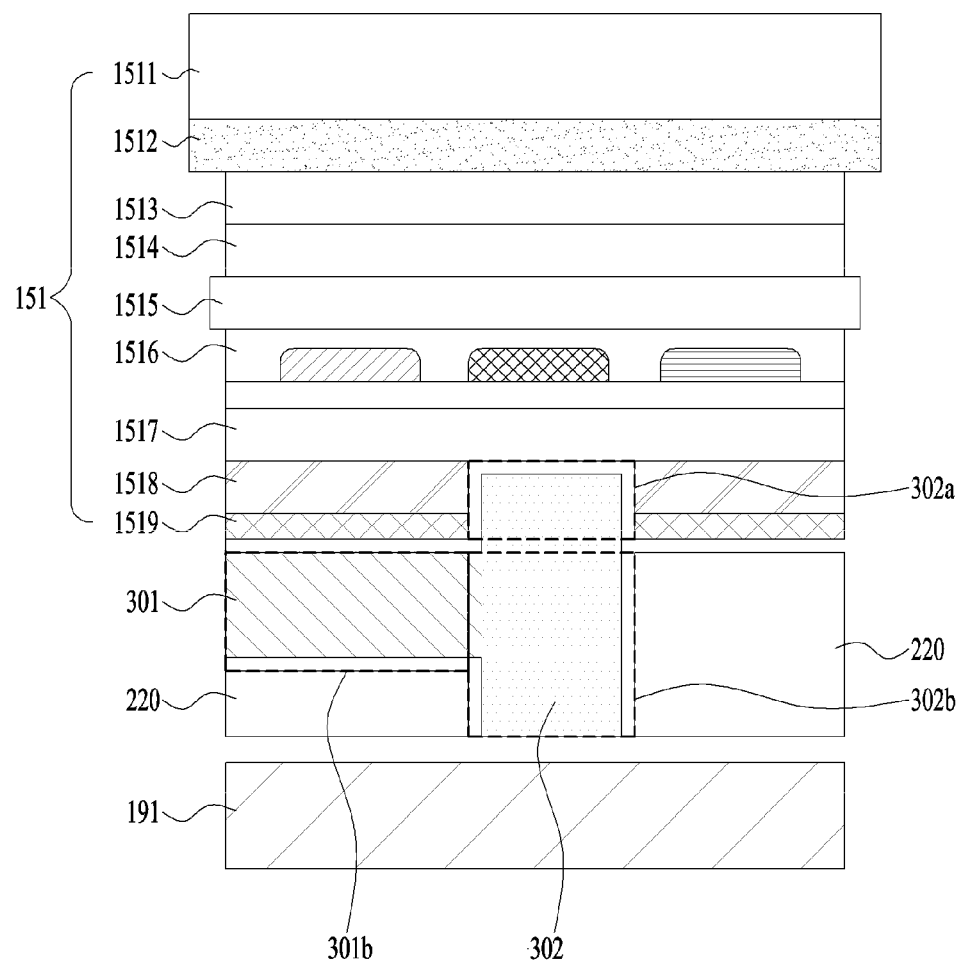
FIG. 9 is a diagram illustrating a structure to insert the integral structure in a rear surface of a display module.

FIG. 9 is a diagram illustrating a structure to insert the integral structure in a rear surface of a display unit 151.

The display unit 151 shown in FIG. 9 may be an OLED display module and include a cover glass 1511; a decoration film 1512; an OCA film 1513; a polarizer (POL, 1514); a touch film 1515; an OLED pixel module 1516; a back plate 1517; a foam pad 1518; and a thermal sheet 1519.

The cover glass 1511 is disposed on the uppermost surface of the display unit 151 to protect internal components.

The decoration-film 1512 may be provided to hide the internal components of the mobile terminal 100 from being exposing outside and configured to coat a specific color on the bezel so as to provide the user with the external beauty.

The OCA (Optical Clear Adhesive) film 1513 is disposed between the touch film 1515 and the cover glass 1511 to adhere them to each other. Generally, materials with high adhesion and transparency and good mechanical property may be used to form the OCA film 1513. Examples of such materials include acryl-based material. The OCA film 1513 may also have a waterproof function to prevent water or moisture from coming into the mobile terminal 100.

The polarizer (POL) 1514 is formed by stretching polyvinyl alcohol (PVA) having iodine (I) or dichroic dye dyed thereon. An absorption axis is formed in the polarizer (POL) 1514 along a stretching direction such that the polarizer may absorb the light vibrating in a horizontal direction with respect to the absorption axis and transmit only the light vibrating in a vertical direction with respect to the absorption axis thereon selectively.

The touch film 1515 is a film-type touch sensor 143 configured to sense the touch input applied by the user. A conductive pattern may be formed on the touch film 1515. The touch film 1515 may include an Rx electrode configured to receive a signal of the user's touch input and a Tx electrode configured to convert the touch input signal into an electrical signal and transmit the electrical signal to the controller 180. The touch film 1515 may be made of a light-transmission material (e.g., polycarbonate (PC), polyethylene Terephthalate (PET)).

The OLED pixel module 1516 is configured RGB sub-pixels with self-illuminous function. Each of the sub-pixels is made of a phosphorus organic compound. The electrons casted from the cathode and anode are coupled to positive charge particles in an organic matter to be spontaneously illuminant. Accordingly, it is not necessary to provide auxiliary liquid crystal or backlights.

The back plate 1517 is configured as film with an acryl-based adhesive layer to function as a reinforcing plate for a rear surface of the OLED pixel module 1516.

The foam pad 1518 is configured to absorb an external shock that might be applied to the display module 151 and buffer the shock transmitted to internal components of the display unit 151. For that, the foam pad 1518 is typically made of an elastic material (e.g., rubber and urethane).

The thermal sheet 1519 is configured to emit heat from the internal electronic components such as the OLED display unit 151 and the main board which might generate much heat during the operation. For that, the thermal sheet 1519 may be made of a metal or carbon material with a relatively high thermal conductivity (e.g., copper and graphite).

The above-noted internal components of the display unit 151 should not limit the embodiments of the present disclosure. Some of the components may be modified into other elements or the order may be changed. In addition, new elements may be further provided.

The above-noted display unit 151 may be supported by a support frame 220. The first piezoelectric layer 301 and the second piezoelectric layer 302 may be disposed between the display unit 151 and the support frame 220.

In this instance, the second piezoelectric layer 302 is thicker than the first piezoelectric layer 301 such that a structure for adjusting the thicknesses to each other. The display module 151 may include the OLED pixel module 1516; and a non-light-transmittance layer 1518 and 1519 disposed under the OLED pixel module 1516. The non-light-transmittance layer 1518 and 1519 may include a first hole 302a in which a front area of the second piezoelectric layer 302 is partially inserted.

The first hole 302a may reduce the thickness of the display unit 151 disposed on the second piezoelectric layer 302, which is advantageous in recognizing the finger-print in case the second piezoelectric layer 302 includes the finger scan sensor. That will be described, referring to FIG. 14.

The support frame 220 may include a stepped area 301b configured to engage with the first piezoelectric layer 301; and a second hole 302b in which a rear area of the second piezoelectric layer 302 is partially inserted.

Some of the rear area of the second piezoelectric layer 302 may penetrate the second hole 302b to contact with or be spaced a preset distance apart from the battery 19 provided under the support frame 220.

Hereinafter, the structure of the support frame 220 including the stepped area 301b and the second hole 302b will be described in detail.

Figure 10:
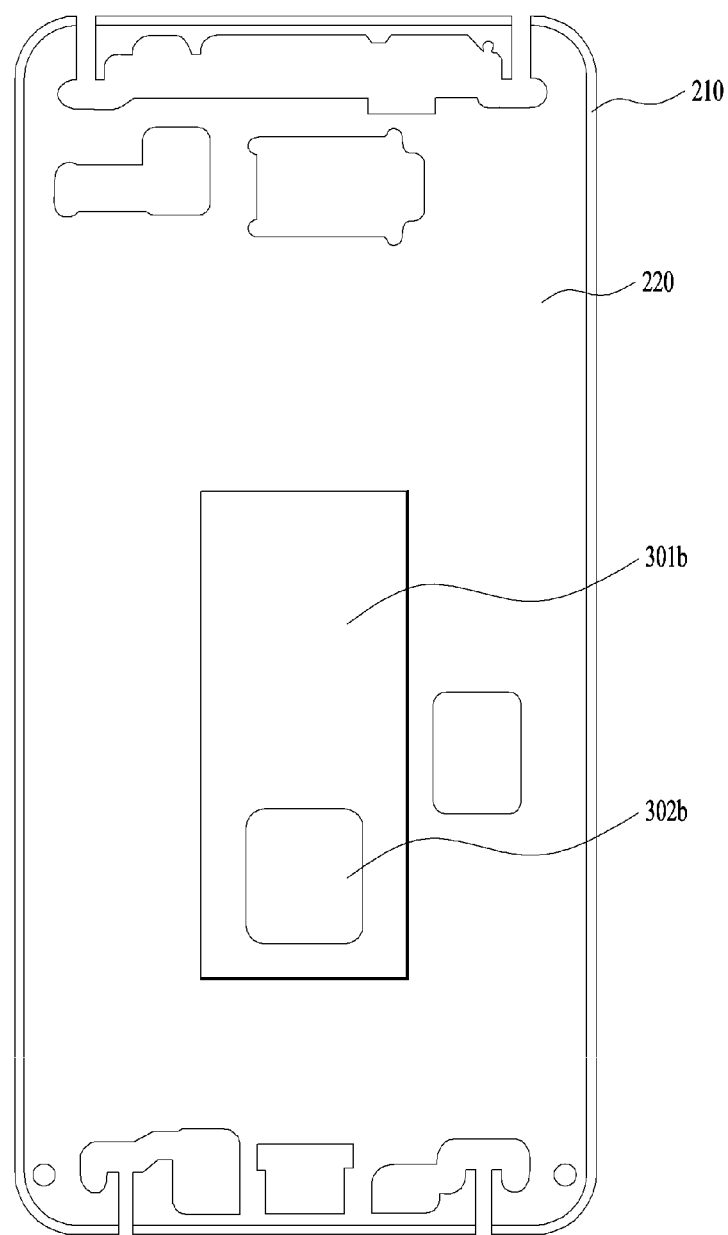
FIG. 10 is a front view illustrating the integral structure configured of the receiver, the haptic module and the force sensor and a support frame provided to support the display module.

FIG. 10 is a front view illustrating the integral structure configured of the receiver, the haptic module and the force sensor and the support frame 220 provided to support the display module.

The support frame 220 may be connected with the middle case 210. Unless the middle case 210 is provided, the support frame 220 may be connected with the rear case 103 (103, see FIG. 2).

The stepped area 301 configured to engage with the first piezoelectric layer inserted between the display module and the support frame 220 may be provided in a front surface of the support frame 220. The stepped area 301b may function to fix the first piezoelectric layer and prevent the thickness of the mobile terminal from being increased by the first piezoelectric layer.

In addition, the support frame 220 may include the second hole 302b configured to insert the rear area of the second piezoelectric layer therein partially. The second hole 302b may be provided in the area having the stepped area 301b.

More specifically, the support frame 220 may support the back side of the display module and prevent the increase of the mobile terminal thickness even when the integral structure configured of the receiver, the haptic module and the force sensor is inserted.

Next, one embodiment providing the finger scan sensor in the second piezoelectric layer 302 will be described.

The finger scan sensor may be categorized into an electrostatic type, an ultrasonic type and an optical type. In case finger scan sensor is provided in a home button of a mechanical key, the user is able to make direct contact between the finger and the home button. Even with a short recognizable distance, the electrostatic type finger scan sensor is used most.

However, a recent trend is that the home button is provided as the touch key to expand the display module area, while the bezel is reduced or removed from the front surface of the mobile terminal. When providing the touch key as the home button at a specific point on the display unit 151, it is important to increase a recognizable distance of the finger scan sensor. However, the thickness of the present OLED display unit 151 is approximately 1.3 mm, which is quite thick. When using the electrostatic type finger scan sensor, the recognition rate is not so high. Accordingly, it is preferred to use the optical type finger scan sensor, because it has the longest recognizable distance.

Figure 11:
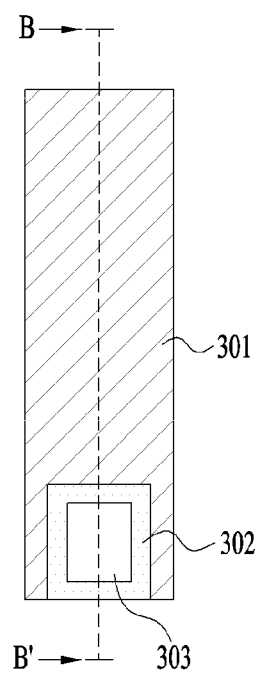
FIG. 11 is a front view illustrating an integral structure configured of a receiver, a haptic module and a force sensor in accordance with another embodiment.

FIG. 11 is a front view illustrating an integral structure configured of a receiver, a haptic module and a force sensor in accordance with another embodiment.

Figure 12:
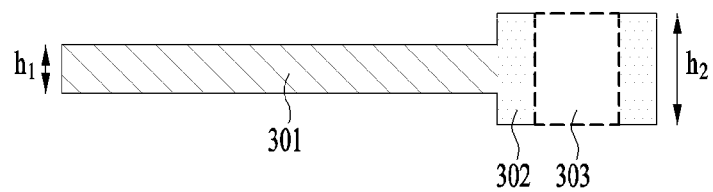
FIG. 12 is a sectional diagram illustrating the integral structure configured of the receiver, the haptic module and the force sensor, viewed along B-B' of FIG. 11.

FIG. 12 is a sectional diagram illustrating the integral structure configured of the receiver, the haptic module and the force sensor, viewed along B-B' of FIG. 11.

The second piezoelectric layer 302 is fixedly coupled to the first piezoelectric layer 301 and the thickness of the second piezoelectric layer 302 is larger than that of the first piezoelectric layer 301 (h2>h1).

In this instance, the second piezoelectric layer 302 includes a third hole 303 that is open in a back-and-front direction and a sensor configured to sense the signal transmitted or received via the display module may be provided in the third hole 303.

The sensor provided in the third hole 303 may be the finger scan sensor configured to recognize or scan the user's fingerprint. The finger scan sensor may be the optical type finger scan sensor, considering that it performs the fingerprint recognition function under the display.

Figure 13:
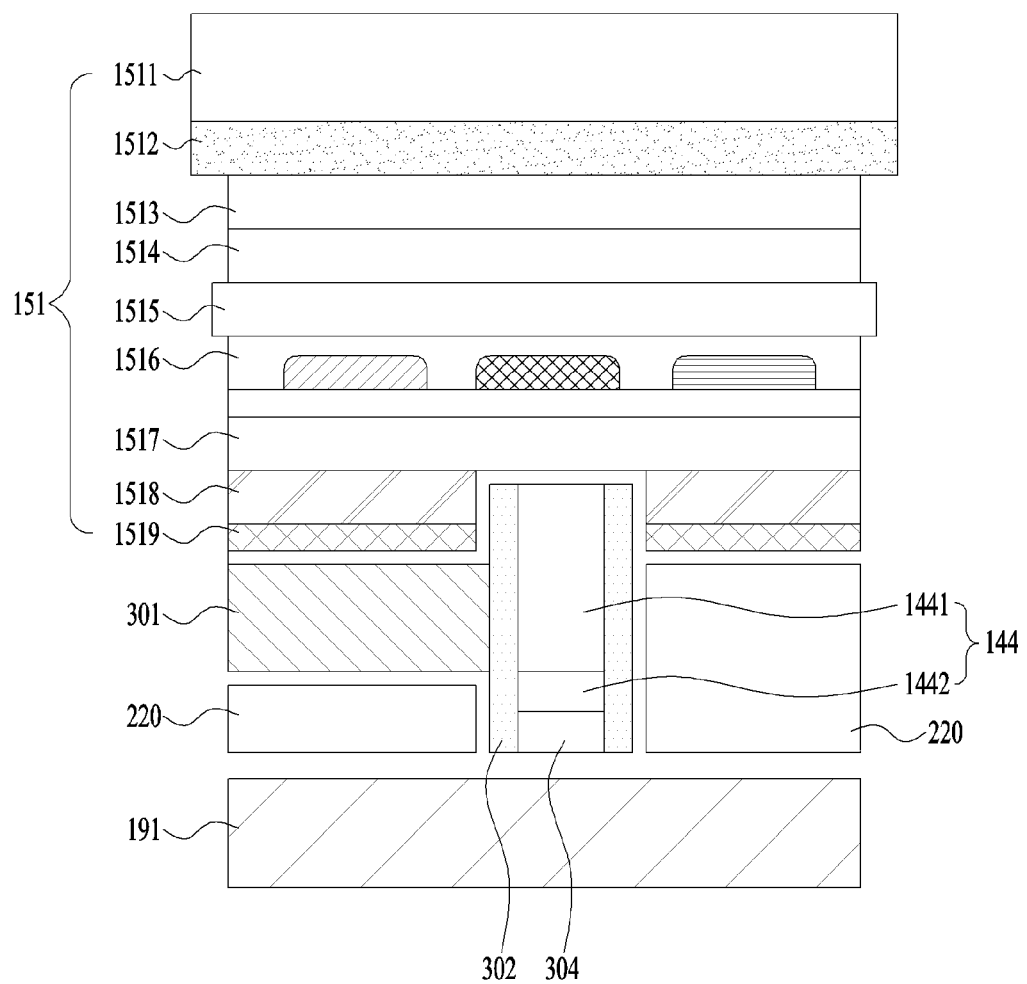
FIG. 13 is a diagram illustrating a structure to insert the integral structure in accordance with the embodiment of FIG. 11 in a rear surface of a display module.

FIG. 13 is a diagram illustrating a structure to insert the integral structure in accordance with the embodiment of FIG. 11 in a rear surface of a display unit 151.

To use the optical type finger scan sensor, the emitted light should be reflected on the user's finger and then penetrate the display unit 151 to be incident on the finger scan sensor again. The display unit 151 includes diverse types such as LCD, TDT, OLED and the like as mentioned above. However, only the current OLED display module is able to allow the emitted light to transmit the display unit 151 again. Especially, the display unit 151 may be provided as a transparent display which is visible outside. Such the display module may be called 'the transparent display' and a typical example of the transparent display is TOLED (Transparent OLED).

As shown in FIG. 13, the non-light transmittance layer 1518 and 1519 of the display unit 151 may be partially eliminated so as to install the optical type finger scan sensor under the OLED display unit 151. Some of the front area of the second piezoelectric layer 302 is inserted in the first hole (302a, see FIG. 9) formed in the non-transmittance layer eliminated area so as to prevent the increase of the thickness and reduce the thickness of the display module disposed on the finger scan sensor simultaneously.

To make the reflected light incident on the finger scan sensor as mentioned above, the reflected light has to transmit the display unit 151. At this time, the reflected light is able to transmit the cover glass 1511, the deco-film 1512, the OCA pixel module 1516, the back plate 1517 and the like, because they are made of the light-transmittance material. However, the foam pad 1518 and the thermal sheet 1519 are made of the non-light-transmittance material to form the non-light-transmittance layer 1518 and 1519.

At this time, a light receiving unit 1441 has to be inserted to contact with a light-transmittance laser 1512, 1513, 1514, 1515, 1516 and 1517 such that the finger scan sensor 144 can raise the fingerprint recognition rate. The OLED pixel module 1516 configured to directly emit light cannot be perforated such that the light receiving unit 1441 may be arranged lower than the OLED pixel module 1516, even when located the closest to the user's finger.

To arrange the finger scan sensor 144 in the under display, it is preferred that the pressure applied to the display module is put into consideration, rather than the above-noted recognizable distance and whether to transmit light. For that, the finger scan sensor 144 may be provided together with the force sensor.

The display unit 151 may function as a touch screen to control the finger scan sensor 144 to be implemented by the touch input. In this instance, the controller (180, see FIG. 1A) could frequently implement the finger scan sensor 144 even when the user does not want and it is not preferred, considering electricity consumption.

More specifically, the current consumption of the optical type finger scan sensor 144 is approximately 18 mA, which is quite much. Each of the OLED pixels of the OLED display unit 151 is luminescent spontaneously such that the OLED display unit 151 may use a lot of currents. However, the home button is realized as the touch key. only if the user holds the mobile terminal 100 in the hand regardless of the user's intension, the display unit 151 might be touched by the user's finger accidently and a wake-up mode might then start. If the finger scan sensor 144 is implemented in the wake up mode only by the simple touch of the user's finger on the display unit, the current consumption might rise such that the battery (191, see FIG. 2) may be discharged early. To prevent the rise of the problem, the force sensor has to be provided. in other words, once a reference value or more of the pressure has to be applied by the user, the force sensor senses the pressure and transmits the sensed value to the finger scan sensor 144 to start the wake up mode such that the used currents can be saved and the early discharging of the battery 191 may be prevented. Accordingly, the finger scan sensor 144 is implemented to sense the fingerprint, once the pressure in a preset range is sensed by the force sensor.

The force sensor may also sense the pressure which facilitates easy fingerprint recognition. Even when the user pushes the display unit 151 too weak or strong, the quality of the fingerprint is likely to deteriorate. Accordingly, the force sensor may be used to sense whether a proper pressure to recognize the fingerprint is applied. For example, when a reference value or threshold is set as 5N, the force sensor senses whether the user pushes the display module with a corresponding pressure to the threshold and the controller controls the finger scan sensor 144 to recognize the fingerprint.

In addition, the finger scan sensor 144 may be provided together with the haptic module for comfortable use. When the force sensor recognizes the proper pressure to recognize the fingerprint, the haptic module may provide the user with a haptic feedback. Or, when the finger scan recognizes the fingerprint, the haptic module may provide the user with the haptic feedback. When receiving a signal for generating a tactile effect from the force sensor, the haptic module may notice to the user that the pressure of the threshold or more is received. When receiving the signal from the finger scan sensor 144, the haptic module may notice to the user that the fingerprint recognition is normally performed. In other words, the haptic module is not limited thereto and may provide the user with the haptic feedback for generating the tactile effect after the pressure is applied, only if notifying the user of diverse information.

More specifically, the finger scan sensor 144 may be provided together with the force sensor and the haptic module. In the mobile terminal of the present disclosure, the second piezoelectric layer 302 surrounding the finger scan sensor 144 may function as the force sensor and the haptic module simultaneously.

When the user applies the pressure to the display module, the second piezoelectric layer 302 generates a voltage and functions as the force sensor configured to sense the pressure applied to the display module according to the size of the voltage. In case the sensed pressure is within a present range, the second piezoelectric layer 302 may sent a signal to the finger scan sensor 144 so as to perform the fingerprint recognition function. In other words, in case a preset pressure is applied to the second piezoelectric layer 302, the OLED pixel module may emit light and the finger scan sensor 144 may receive the reflected light.

The second piezoelectric layer 302 may be employed as the haptic module for providing the haptic feedback via the display module 151 by applying a voltage. Accordingly, the second piezoelectric layer 302 may provide the user with the haptic feedback for the user to recognize whether it functions as the finger scan sensor 144 or whether the finger scan sensor 144 recognizes the user's fingerprint haptic module, which may provide the user with using convenience in terms of UX.

Moreover, the second piezoelectric layer may be provided around the finger scan sensor to provide the user with a direct haptic feedback. In other words, a source of the feedback is located under the user's finger in the mobile terminal such that the location to which the user applies the pressure may be corresponding to the source of the feedback.

More specifically, when the finger scan sensor 144 recognizes the fingerprint, the second piezoelectric layer may generate a second frequency in the mobile terminal.

If you look at the structure of the finger scan sensor 144 more specifically, the finger scan sensor 144 may include a light receiving unit 1441; FPCB 1442; and a stiffener.

The light receiving unit 1441 is loaded on the FPCB (Flexible Printed Circuit Board) 1442 and the stiffener may be attached to a back side of the FPCB 1442. In other words, the light receiving unit 1441, the FPCB 1442 and the stiffener may be multilayered in order.

The light receiving unit 1441 may receive the reflected light transmitting the display module 151 and recognize the user's fingerprint. As mentioned above, the distance between the user's finger and the finger scan sensor 144 is far when the finger scan sensor 144 is realized as the under display. Accordingly, the optical type finger scan sensor 144 having the maximum recognizable distance is used.

The stiffener may be employed to enhance the stiffness of the finger scan sensor 144. At this time, the stiffener may be a third piezoelectric layer 304 made of the piezo material and FIG. 13 shows the stiffener is provided as the third piezoelectric layer 304. The second piezoelectric layer 304 may be provided around the finger scan sensor 144 such that the third piezoelectric layer 304 may reinforce the haptic feedback of the finger's center which is provided to the user.

More specifically, the third piezoelectric layer 304 is provided under the finger scan sensor 144 and configured to sense the applied pressure. Also, the third piezoelectric layer 304 generating a third frequency may be provided in a third hole.

When the finger scan sensor 144 is used in recognizing the user's fingerprint, the third piezoelectric layer 304 may form the third frequency. At this time, the third frequency may be equal to the second frequency. Considering diverse haptic feedbacks, the third frequency needs not be equal to the second frequency.

As the second piezoelectric layer 302 provides the user with the haptic feedback, the third piezoelectric layer 304 may form the third frequency in case the finger scan sensor recognizes the fingerprint.

Hereinafter, one embodiment will be described to sense and compensate misorientation based on the measured direction of the pressure as well as the size of the pressure applied via the second piezoelectric layer, even if the user applies the pressure to a misoriented location from a regular position.

The second piezoelectric layer 302 may have a polygonal loop shape and be segmented to sense the sizes of the pressured applied to corners of the polygonal loop shape. Each of the segmented parts (or corners) may form one channel such that the second piezoelectric layer 302 may provide a multi-channel function. In other words, when a difference between the sizes of the pressures applied to the corners of the second piezoelectric layer 302 is over a present error range, the controller (180, see FIG. 1A) senses that the user is applying the pressure in a state of being misoriented from the regular position of the finger scan sensor 144 and display an indicator configured to correct or compensate the direction in which the pressure is applied on the display module.

Figure 14:
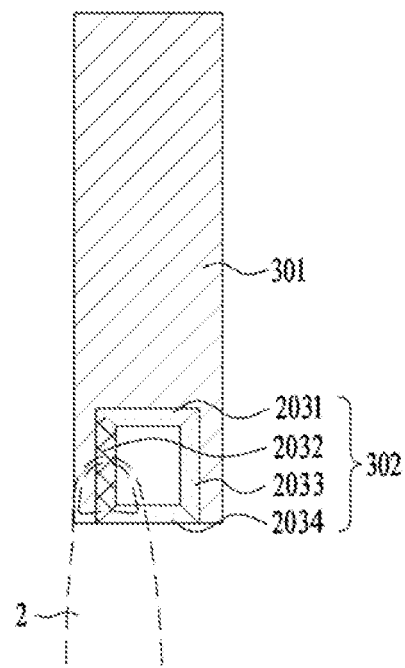
FIG. 14 is a diagram illustrating that a pressure is applied to predetermined sides of the haptic module and the force sensor, respectively.

FIG. 14 is a diagram illustrating that a pressure is applied to predetermined sides of the haptic module and the force sensor, respectively.

Figure 15:
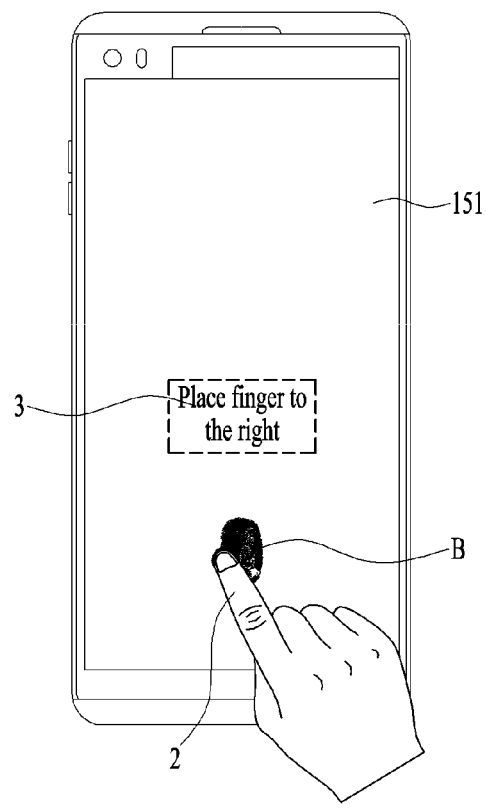
FIG. 15 is a diagram illustrating that an indicator is displayed on the display module, when the pressure is applied to the sides of the haptic module and the force sensor, respectively, as shown in FIG. 14.

FIG. 15 is a diagram illustrating that an indicator is displayed on the display module, when the pressure is applied to the sides of the haptic module and the force sensor, respectively, as shown in FIG. 14.

The second piezoelectric layer 302 configured to provide the multi-channel function may measure not only the size of the applied pressure but also the direction of the applied pressure. Accordingly, even if the user applies the pressure in a misoriented position with respect to the regular position set in the finger scan sensor 144, the misorientation may be sensed. For example, as shown in FIG. 14, the user is likely to press a position misoriented to the left from the regular position of the finger scan sensor 144 by the finger 2. In this instance, the sizes of the pressures applied to the first, third and fourth channels are larger than the size of the pressure applied to the second channel. Also, the finger scan sensor 144 is unable to recognize the fingerprint smoothly.

The second piezoelectric layer 302 senses that the difference between the pressures applied to the first, third and fourth channels and the pressure applied to the second channel is beyond the preset error range, once the pressure applied to the second channel is larger than the pressures applied the other channels, and the finger scan sensor 144 is unable to recognize the fingerprint smoothly. In this instance, the controller 180 of the mobile terminal 100 may determine that the user's finger 2 is separated to the left from the regular position of the finger scan sensor 144. The preset error range is set as the threshold to determine that the user's finger 2 is misoriented from the regular position of the finger scan sensor 144 and it may be predetermined by experiments, considering diverse conditions including the sensitivity of the finger scan sensor 144, which can be applied to the other following embodiments equally. As shown in FIG. 15, the controller 180 may display an indicator 3 on the display unit 151 to correct the location of the user's finger 2 to the right.

In case a plurality of second piezoelectric layers functioning as the haptic module and the force sensor are provided, diverse vibration patterns may be formed by using the plurality of the second piezoelectric layers, which will be described hereinafter.

Figure 16:
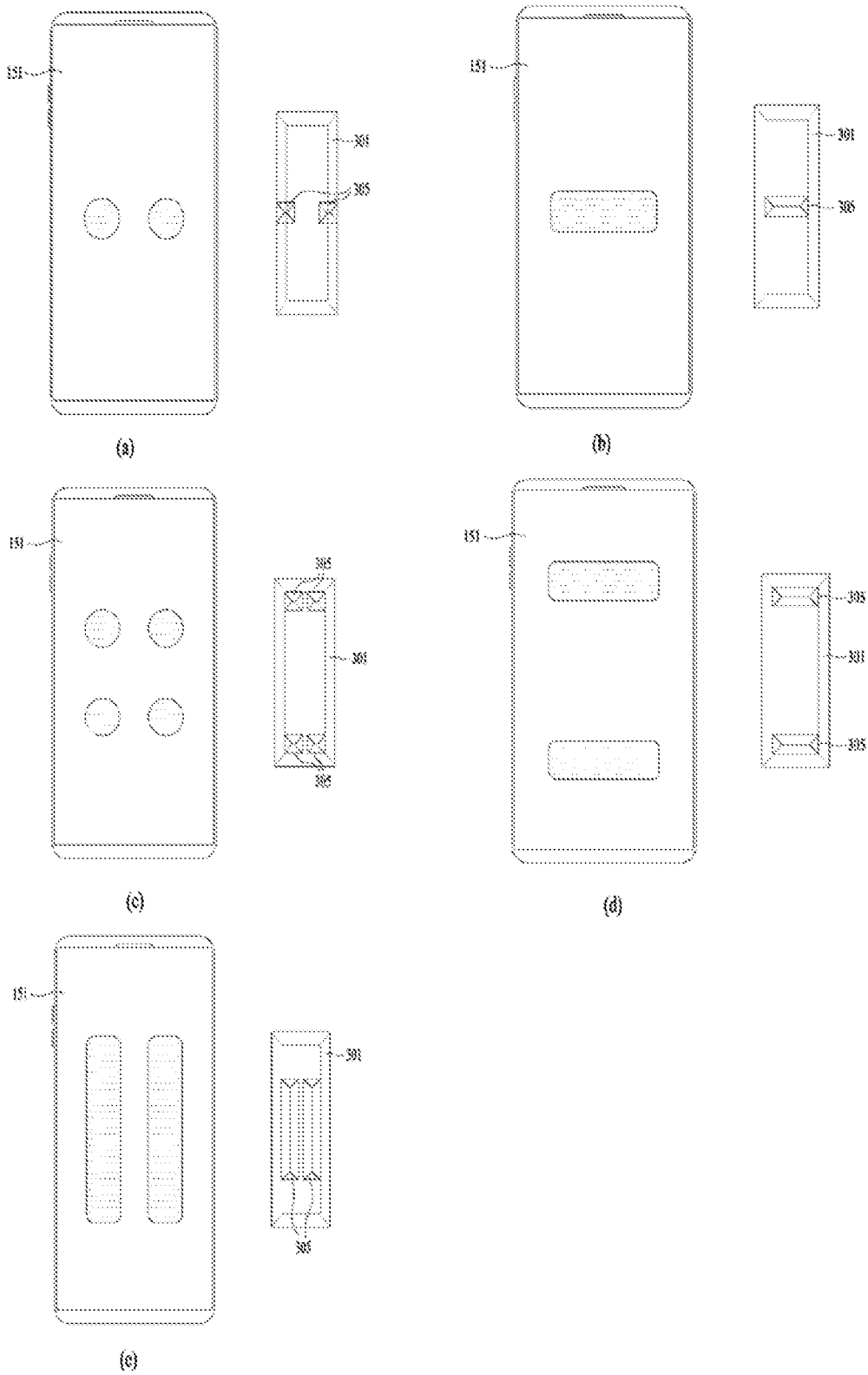
FIG. 16 is a conceptual diagram illustrating an integral structure configured of a receiver, a plurality of haptic modules and a plurality of force sensors.

FIG. 16 is a conceptual diagram illustrating an integral structure configured of a receiver, a plurality of haptic modules and a plurality of force sensors.

The integral structure configured of the receiver, the haptic module and the force sensor may include a plurality of second piezoelectric layers configured to function as the haptic module and the force sensor and arranged in one direction.

Like the single second piezoelectric layer 302, the second piezoelectric layers 305 may be thicker than the first piezoelectric layer 301 and arranged in the same area with the first piezoelectric layer 301, in a state of being fixedly coupled to the first piezoelectric layer.

The plurality of the second piezoelectric layers 305 shown in FIGS. (a) through (e) of FIG. 16 may be arranged in different directions corresponding to the display module or in one direction.

The plurality of the second piezoelectric layers 305 may form a specific vibration pattern via the display module 151. The specific vibration pattern may be formed by variation of vibration strength, presence of vibration, vibration location, a vibration phase difference and a vibration frequency of each of the second piezoelectric layers.

The specific vibration pattern may be varied according to the location of the touch input and the pressure applied to the display unit 151. When the touch input is a drag touch input, the specific vibration pattern may be continuously variable, corresponding to the touch input. In other words, when a drag touch input is applied in one direction, the specific vibration pattern may be continuously variable.

Figure 17:
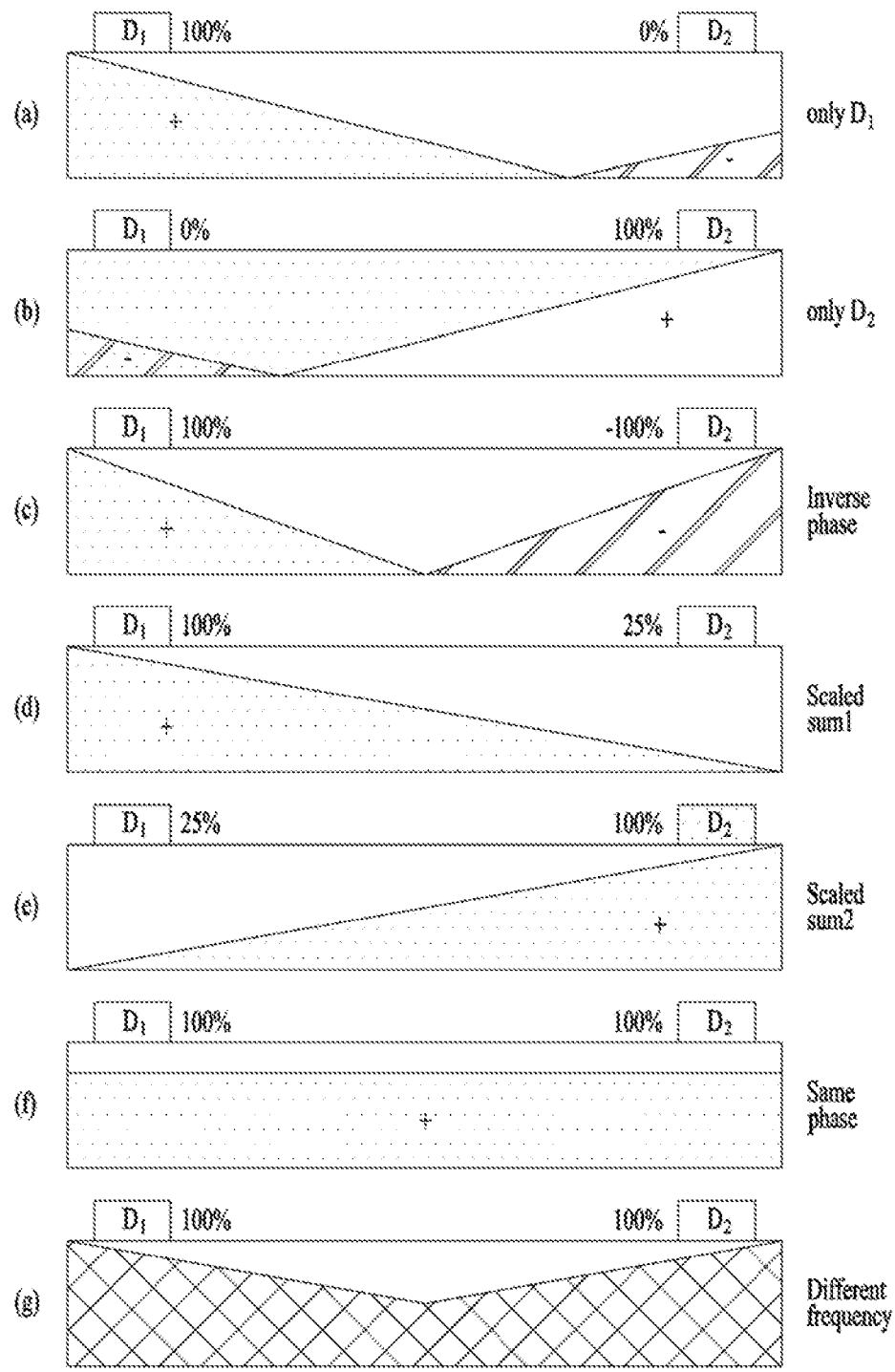
FIG. 17 is a diagram to describe one embodiment that a specific vibration pattern is formed by using the plurality of the haptic modules and the plurality of the force sensors.

FIG. 17 is a diagram to describe one embodiment that a specific vibration pattern is formed by using the plurality of the haptic modules and the plurality of the force sensors.

FIG. 17 (a) illustrates one embodiment that a haptic feedback is generated in case a touch input or pressure is applied to a first point (D1) on the display module. The user is able to sense a strong vibration at the first point (D1). If the sensed touch input or pressure becomes farther from the first point (D1), the vibration becomes weak. A weak vibration phase-changed with the first point (D1) may be formed at a second point (D2) spaced a preset distance apart from the first point (D1).

FIG. 17 (b) illustrates one embodiment that a haptic feedback is generated when a touch input or pressure is applied to the second point (D2) on the display module.

FIG. 17 (c) illustrates one embodiment that the same sized-haptic feedbacks with changed phases are generated at the first point (D1) and the second point (D2). The haptic feedbacks generated at the both points are offset at a middle point to form the vibration of which both sides have the reverse phases with respect to the middle point having no vibration.

FIG. 17 (d) illustrates one embodiment that the vibration generated at the second point (D2) of FIG. 17(a) is offset. At the same time when the haptic feedback is generated at the first point (D1), a relatively weak haptic feedback is generated at the second point (D2) and vibration is offset at the second point (D2). A weak phase-changed vibration may be generated at the second point (D2) by the vibration generated at the first point (D1). Accordingly, a weak vibration having the same phase with the vibration generated at the first point (D1) is generated to offset the vibration transmitted from the first point (D1).

FIG. 17 (e) illustrates one embodiment that the vibration generated at the first point (D1) of FIG. 17 (b) is offset. The method of the offset is the same with the method mentioned above.

FIG. 17 (f) illustrates one embodiment that the same phase haptic feedbacks are generated at the first point (D1) and the second point (D2). FIG. 17 (g) illustrates one embodiment that haptic feedbacks having different phases are generated.

Figure 18:
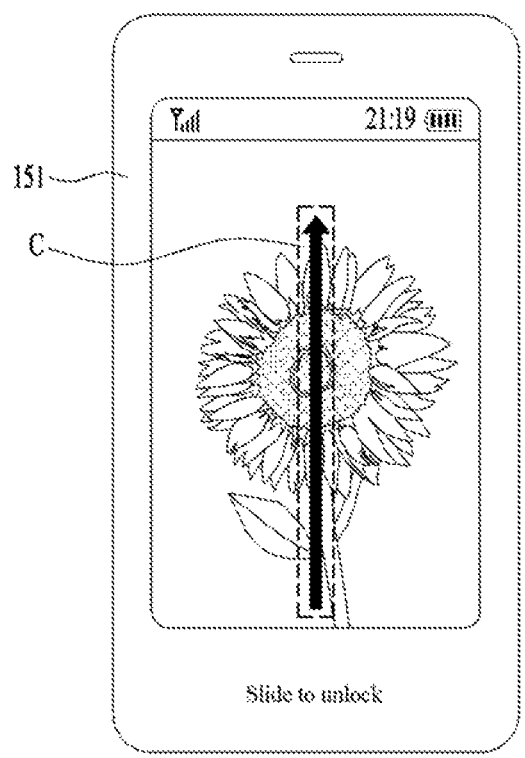
FIGS. 18 and 19 are front views of a display module to describe embodiments for forming the specific vibration pattern.
Figure 19:
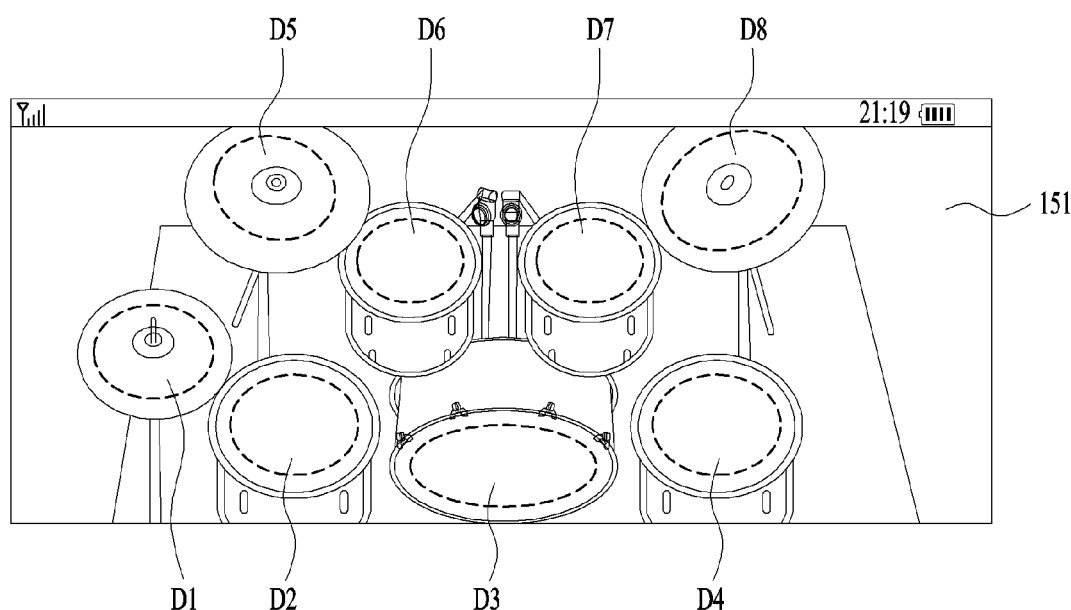

FIGS. 18 and 19 are front views of the display module to describe one embodiment that a specific vibration pattern is formed.

The display module 151 may provide an UI configured to slide to unlock the screen and the specific vibration pattern may be the pattern which is serially variable according to a drag touch input (C).

In other words, when dragging a touch input (C) on the display module 151, the user is able to sense the moving of vibration along the finger.

The display module 151 may display a musical instrument (e.g., a drum) as shown in FIG. 19 and the specific vibration pattern may be diversely generated according to a kind, point (D1~D8) and presence of simultaneous touches.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
 a display;
 a first piezoelectric layer located on a rear side of the display and configured to vibrate the display by generating a first frequency in an audible range; and
 a second piezoelectric layer located on the rear side of the display and configured to:
 sense pressure transmitted from the display; and
 provide a haptic feedback at a second frequency,
 wherein the second piezoelectric layer is thicker than the first piezoelectric layer in a front-to-back direction and fixedly coupled to one end of the first piezoelectric layer to make weight bias.

2. The mobile terminal of claim 1, wherein:
 the first piezoelectric layer is located at a first area of the rear side of the display; and
 the second piezoelectric layer is located at a second area included in the first area and insulated with the first piezoelectric layer.

3. The mobile terminal of claim 2, wherein the second area is located at an edge area of the first area and a center of an overall mass of the first and second piezoelectric layers is deviated from a center of the first area.

4. The mobile terminal of claim 1, wherein the display comprises:

an organic light emitting diode (OLED) pixel module configured to emit light; and
a non-light-transmittance layer disposed under the OLED pixel module, and
wherein the non-light-transmittance layer is shaped to form a front hole configured to receive a front area of the second piezoelectric layer.

5. The mobile terminal of claim 1, further comprising:
a support frame configured to support the display,
wherein the first piezoelectric layer and the second piezoelectric layer are disposed between the display and the support frame.

6. The mobile terminal of claim 5, wherein:
the support frame comprises a stepped area configured to engage with the first piezoelectric layer; and
the support frame is shaped to form a rear hole configured to receive a rear area of the second piezoelectric layer.

7. The mobile terminal of claim 1, wherein:
the second piezoelectric layer is shaped to form a middle hole that is open in the front-to-back direction; and
the second piezoelectric layer comprises a sensor located in the middle hole and configured to sense a signal transmitted or received via the display.

8. The mobile terminal of claim 7, wherein the sensor is a finger scan sensor configured to recognize a user's fingerprint.

9. The mobile terminal of claim 8, wherein the finger scan sensor recognizes the user's fingerprint when a preset pressure is received by the second piezoelectric layer.

10. The mobile terminal of claim 9, wherein the second piezoelectric layer is further configured to generate a second frequency when the finger scan sensor recognizes the user's fingerprint.

11. The mobile terminal of claim 10, further comprising:
a third piezoelectric layer located behind the finger scan sensor and configured to:
sense pressure transmitted from the finger scan sensor; and
generate a third frequency.

12. The mobile terminal of claim 11, wherein the third piezoelectric layer is further configured to generate the third frequency when the finger scan sensor recognizes the fingerprint.

13. The mobile terminal of claim 11, wherein the third frequency is equal to the second frequency.

14. The mobile terminal of claim 7, wherein the second piezoelectric layer has a polygonal loop shape and is further configured to sense a size of the pressure applied to each of corners of the polygonal loop shape.

15. The mobile terminal of claim 14, wherein the display is configured to display an indicator configured to compensate a direction in which the pressure is applied when a difference between sizes of the pressures applied to the corners of the second piezoelectric layer is greater than a preset error range.

16. The mobile terminal of claim 1, wherein:
the second piezoelectric layer comprises a plurality of second piezoelectric layers located on the rear side of the display;
a specific vibration pattern is generated through the display; and
the specific vibration pattern is generated by varying a vibration strength, presence of vibration, a vibration location, a vibration phase difference, and a vibration frequency.

17. The mobile terminal of claim 16, wherein:
the display is a touch screen; and
the second piezoelectric layer is further configured to generate the specific vibration pattern according to a location of the touch screen at which a touch input is received.

18. A mobile terminal comprising:
a display;
a first piezoelectric layer located on a rear side of the display and configured to vibrate the display by generating a first frequency in an audible range; and
a second piezoelectric layer located on the rear side of the display and configured to:
sense pressure applied to the display; and
provide a haptic feedback at a second frequency in response to the sensed pressure,
wherein the second piezoelectric layer is thicker than the first piezoelectric layer in a front-to-back direction and fixedly coupled to one end of the first piezoelectric layer to make weight bias.

* * * * *